(12) United States Patent  
Curtis (10) Patent No.: US 7,895,593 B2
(45) Date of Patent: Feb. 22, 2011

(54) APPARATUS AND METHOD FOR MONITORING AND ROUTING STATUS MESSAGES

(75) Inventor: Bryce Allen Curtis, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 875 days.

(21) Appl. No.: 11/830,011

(22) Filed: Jul. 30, 2007

(65) Prior Publication Data

US 2008/0005735 A1  Jan. 3, 2008

Related U.S. Application Data

(63) Continuation of application No. 10/184,860, filed on Jun. 28, 2002, now Pat. No. 7,296,266.

(51) Int. Cl.
 G06F 9/445 (2006.01)
(52) U.S. Cl. .................. 717/175; 717/168; 717/174
(58) Field of Classification Search .................. 717/175
See application file for complete search history.

(56) References Cited

U.S. PATENT DOCUMENTS

| | | | |
|---|---|---|---|
| 5,867,713 | A | 2/1999 | Shrader et al. |
| 6,023,507 | A | 2/2000 | Wookey |
| 6,044,398 | A | 3/2000 | Marullo et al. |
| 6,067,639 | A | 5/2000 | Rodrigues et al. |
| 6,079,036 | A | 6/2000 | Moharram |
| 6,115,680 | A | 9/2000 | Coffee et al. |
| 6,216,173 | B1 | 4/2001 | Jones et al. |
| 6,263,362 | B1 | 7/2001 | Donoho et al. |
| 6,314,449 | B1 | 11/2001 | Gallagher et al. |

(Continued)

FOREIGN PATENT DOCUMENTS

JP  2000035929  2/2000

(Continued)

OTHER PUBLICATIONS

Sun Microsystems, Inc., J2SE 1.3.1, API Specification, 1999-2001 (14 pages extracted) http://java.sun.com/j2se/1.3/docs/api/overview-summary.html.

(Continued)

*Primary Examiner*—Thomas K Pham
(74) *Attorney, Agent, or Firm*—Yee & Associates, P.C.; Jeffrey S. LaBaw (57) ABSTRACT

An apparatus and method for monitoring and routing status messages to another process running on the same or a different computing system during the installation of one or more applications are provided. With the apparatus and method, one or more objects can monitor the progress, log events, status message, etc., generated during an installation, silent or otherwise, of one or more products. Monitoring includes a Status Listener object and a Status Producer object for the installation application. The Status Producer object obtains status messages, progress indications, and log events from a vendor supplied installation program. The Status Producer object then forwards these messages to registered Status Listeners that implement the Status Listener interface. The Status Listeners then forward these messages to their associated external processes which may be located on the same or a remotely located computing system.

11 Claims, 4 Drawing Sheets

U.S. PATENT DOCUMENTS

| | | | |
|---|---|---|---|
| 6,381,742 B2 * | 4/2002 | Forbes et al. | 717/176 |
| 6,615,091 B1 | 9/2003 | Birchenough et al. | |
| 6,633,899 B1 | 10/2003 | Coward | |
| 6,698,018 B1 | 2/2004 | Zimniewicz et al. | |
| 6,701,514 B1 | 3/2004 | Haswell et al. | |
| 6,802,067 B1 | 10/2004 | Camp et al. | |
| 6,829,770 B1 | 12/2004 | Hinson et al. | |
| 2001/0034771 A1 | 10/2001 | Hutsch et al. | |
| 2002/0188941 A1 * | 12/2002 | Cicciarelli et al. | 717/175 |
| 2003/0084436 A1 | 5/2003 | Berger et al. | |

FOREIGN PATENT DOCUMENTS

| | | |
|---|---|---|
| JP | 2000330822 | 10/2000 |
| JP | 2001223698 | 6/2001 |
| JP | 2001350756 | 12/2001 |
| WO | 9831155 A2 | 7/1998 |

OTHER PUBLICATIONS

Kiselev, "A Portable Distributed Event-Logging Facility", Dr. Dobb's Journal, vol. 26, No. 9, pp. 26-30, Sep. 2001.

"WinRunner Power Test Automation for the Enterprise", May 30, 2002, pp. 1-2 http://www-heva.mercuryinteractive.com/products/winrunner/.

* cited by examiner

APPARATUS AND METHOD FOR MONITORING AND ROUTING STATUS MESSAGES

This application is a continuation of application Ser. No. 10/184,860, filed Jun. 28, 2002 now U.S. Pat. No. 7,296,266.

BACKGROUND OF THE INVENTION

1. Technical Field

The present invention is generally directed to an improved computing system. More specifically, the present invention is directed to an apparatus and method for routing status messages to another process running on the same or a different computing system.

2. Description of Related Art

During the installation of middleware and suite products, the user is asked to input installation options. The installation program then takes this data and invokes the installation of one or more other products silently. This greatly simplifies the installation process for the user by asking for the information only once instead of showing the install dialogs from each product which may ask for the same information several times. Also, once all of the information is provided, a silent install hides the complexity of various install options from the user and makes a multiple-install look like a single product.

However, with silent installs, any status messages, event logs, or progress indicators, such as 0-100 percent, provided by the silently invoked installation program does not get fed back to the master install program. Thus, there is no ability to monitor the installation of these silently invoked installation programs. Moreover, any logs that may be generated by such silently invoked installation programs may be stored in different locations within a computing system and may not be easily accessible, rather than having a single log file that logs all events during the installation of all of the products.

Thus, it would be beneficial to have an apparatus and method of monitoring such silent installations of products and routing status messages, log events, progress indicators, etc. to a destination process for such monitoring and other processing, on the same or a different computing system on which the installation is being performed.

SUMMARY OF THE INVENTION

The present invention provides an apparatus and method for monitoring and routing status messages to another process running on the same or a different computing system during the installation of one or more applications. With the apparatus and method of the present invention, one or more objects can monitor the progress, log events, status message, etc., generated during an installation, silent or otherwise, of one or more products.

Monitoring includes a Status Listener object and a Status Producer object for the installation application. The Status Producer object obtains status messages, progress indications, and log events from a vendor supplied installation program. The Status Producer object then forwards these messages to registered Status Listeners that implement the Status Listener interface. The Status Listeners then forward these messages to their associated external processes which may be located on the same or a remotely located computing system.

These and other features and advantages of the present invention will be described in, or will become apparent to those of ordinary skill in the art in view of the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
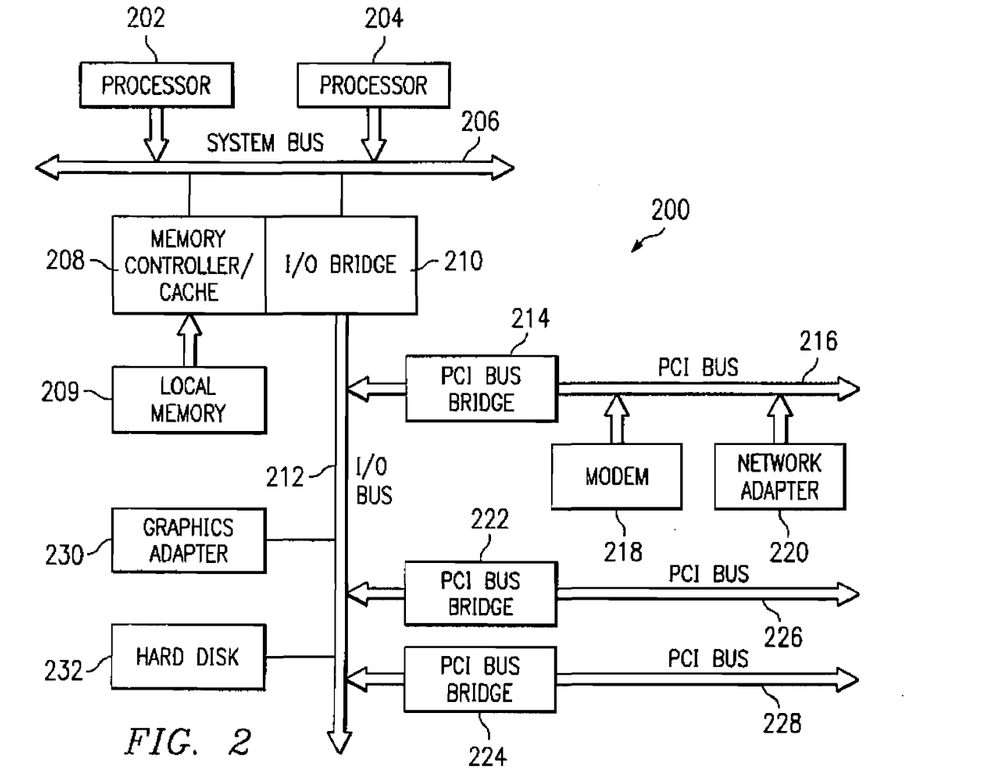
FIG. 2 is an exemplary block diagram of a server in accordance with the present invention.
Figure 3:
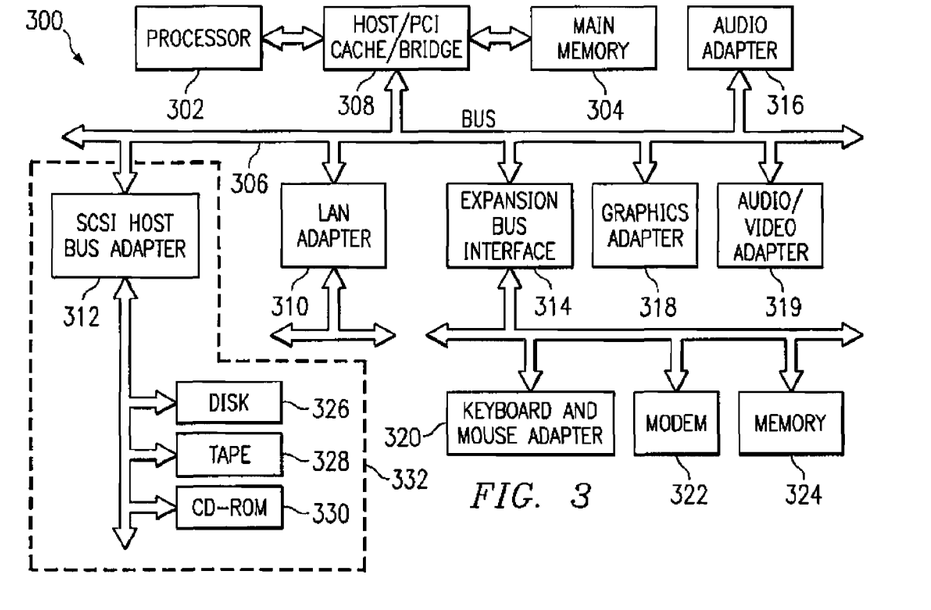
FIG. 3 is an exemplary block diagram of a client device in accordance with the present invention.

The present invention provides an apparatus and method for monitoring and routing status messages of computer programs. The present invention may be implemented in a stand alone computing system or in any distributed or network based computing system. Thus, FIGS. 1-3 are provided to illustrate such computing environments in which the present invention may be implemented.

Figure 1:
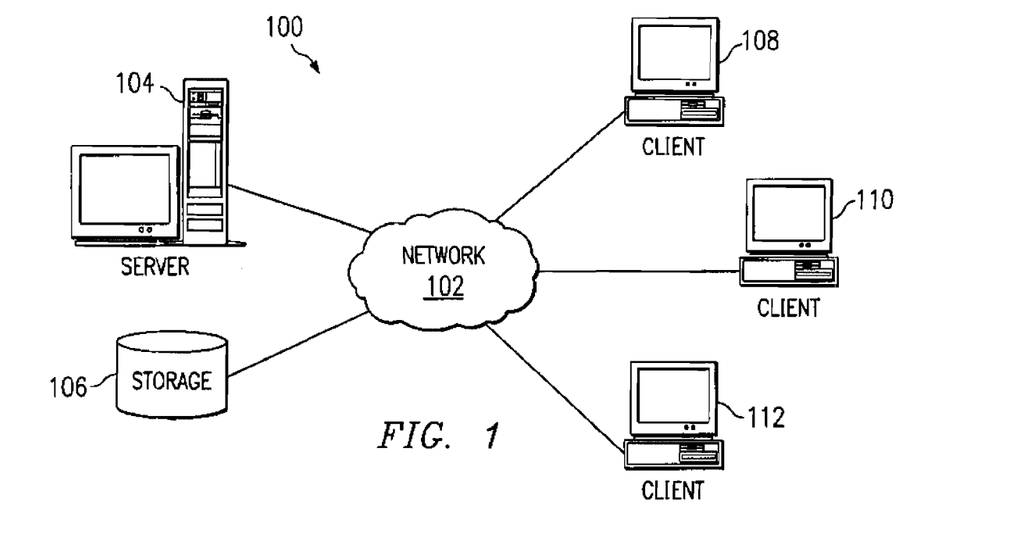
FIG. 1 is an exemplary block diagram of a network computing system in accordance with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206.

Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides a mechanism for monitoring and routing status messages of computer programs. With the present invention, a status listener and a status producer are implemented by a first process in order to provide status, progress and log messages to status listeners in the same or a different process running locally or remotely. The status listener obtains status messages, progress indications, and log events from the status producer included in the vendor supplied installation program. The status producer produces the status messages, log entries, etc. that are written to a designated file, provided to another running process, or output to an output device for review by a user.

With the present invention any process may register as a status listener with the progress class. The status producer interface implemented by the progress class adds the process as a new listener. In order to register as a status listener, the process calls a listener class which implements the status listener interface. The listener object registers as a status listener by calling the method on the producer object that is used to add listeners to a status listener data structure.

Thereafter, when an object being installed by an installation program calls the progress class in order to update the progress of the installation, the progress class which implements the status producer interface sends status update messages, progress indicators, log message, etc. to registered listeners that implement the status listener interface.

Figure 4:
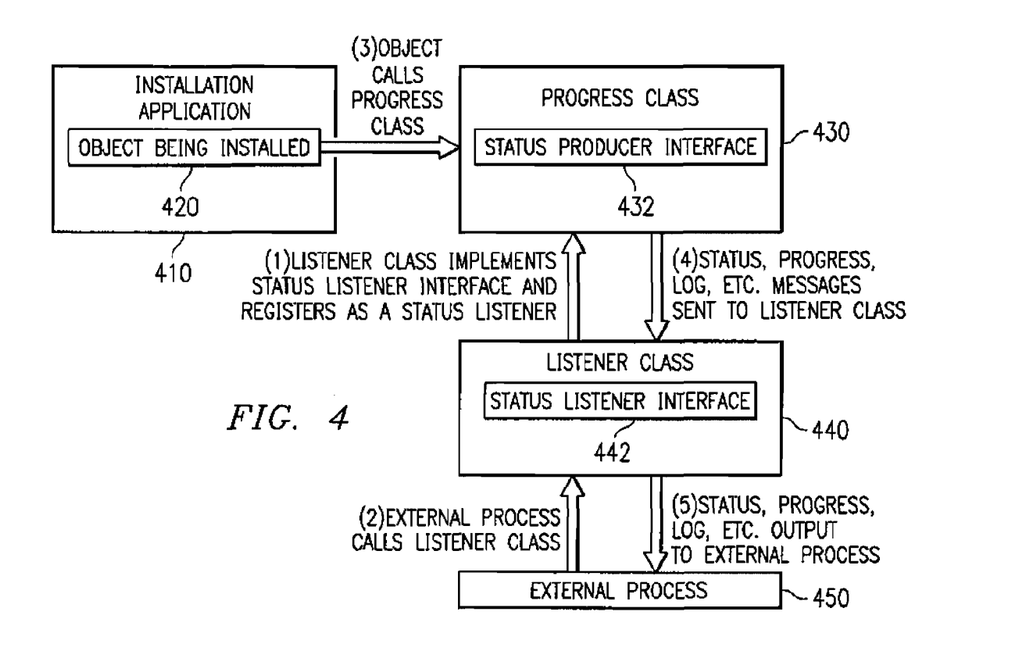
FIG. 4 is an exemplary diagram illustrating the primary operational components of one embodiment of the present invention.

FIG. 4 illustrates the primary operational components of the present invention according to a first embodiment of the invention. As shown in FIG. 4, a Listener class 440, which implements the status listener interface 442, calls a method for adding the listener class instance to a listing of registered listeners of the Progress class 430, which implements the status producer interface 432. Thereafter, when an object being installed 420 by the installation program 410 calls the progress class 430 to output the progress of the installation, the progress class 430, which implements the status producer interface 432, sends a status message to all registered status listeners 442. The status listener 442 is then used to transmit the generated status message to all remote listeners. In this way, any external process 450 may obtain status updates of an installation operation even if the installation operation is a silent installation operation.

The progress class 430 of the present invention is a modified form of the known public Progress class. The known progress class can be called to display the progress of an operation in a dialog box or other graphical user interface object. An instance of the Progress class, i.e. a Progress object, has several methods which can be called by the install program. One of these methods is the progressInfo( ) method shown below:

```
public class Progress {
/**
*Called by the object being installed to notify that
*a file is being copied, and what percent is complete
*
*@param status the directory that the file is being
*copied to or the message that is displayed on the
*progress dialog.
*@param fileName the file name being copied
*@param percent the percent comlete that this file set is
*/
    public void progressInfo(String status, String
    fileName, int percent){
        //Display information in a dialog box
        if (progressGUI != null){
            progress.setStatus(status);
            progress.setFileName(fileName);
            progress.setProgress(percent);
        }
    }
}
```

This progressInfo( ) method simply displays the information passed to it in a dialog box. The limitation with this approach is that the progress and status is only displayed in a GUI object. However, by changing this progressInfo (method) to send its progress to any object that has asked for it, flexibility in sending progress messages is greatly increased. The present invention provides such flexibility by modifying the Progress class to make use of Status listener and Status Producer interfaces so that progress information may be sent to any object registered as a listener.

A status listener interface, according to one exemplary embodiment of the present invention, is as follows:

```
public interface StatusListener {
    /**
    *Send a status message.
    *
    *@param text the status message.
    */
    public void notify(String text);
```

```
    /**
    *Send a status message.
    *
    *@param message1 the directory of the file being
    *installed or another comment.
    *@param message2 the name of the file being
    *installed or another comment.
    */
    public void notify(String message1, String message2, int
percent);
    /**
    *Stop all monitoring and close connection
    */
    public void exitStatus( );
}
```

A status producer interface, according to one exemplary embodiment of the present invention, is as follows:

```
Public interface StatusProducer {
    /**
    *Add a Status listener.
    *
    *@param statusListener the Status listener to add
    */
    public void addStatusListener (StatusListener
    statusListener);
    /**
    *Remove a Status listener.
    *
    *@param statusListener the Status listener to remove
    */
    public void removeStatusListener(StatusListener
    statusListener);
}
```

By modifying the known Progress class shown above to implement the Status Producer interface, any class that implements the Status Listener interface can easily obtain all status and progress messages. This is because the Status Producer interface relays any status messages it receives from the installation application to all registerd Status Listeners implementing the Status Listener interface.

The new Progress class according to an exemplary embodiment of the present invention is as follows:

```
Public class Progress implements StatusProducer {
/**
*Called by the object being installed to notify that
*a file is being copied, and what percent is complete
*
*@param status the directory that the file is being
*copied to or the message that is displayed on the
*progress dialog.
*@param fileName the file name being copied
*@param percent the percent complete that this file set is
*/
    public void progressInfo(String status, String
    fileName, int percent){
        //Display information in a dialog box
        if (progressGUI != null){
            progress.setStatus(status);
            progress.setFileName(fileName);
            progress.setProgress(percent);
        }
        //Send progress and status to any registered
        processes
        for (int i=0; i<statusListeners.size( );i++){
            ((StatusListeners)statusListeners.elementAt
```

```
            (i)).notify(status, fileName, percent);
            }
      }
}
/**
*Add a status listener
*
*@param statusListener the status listener to add
*/
public void addStatusListener(StatusListener
statusListener){
      synchronized(statuslock){
      statusListeners.removeElement(statusListener);
      statusListeners.addElement(statusListener);
      }
}
/**
*Remove a status listener
*
*@param statusListener the status listener to remove
*/
Public void removeStatusListener(Status Listener
status Listener){
      Synchronized(statuslock){
      StatusListeners.removeElement(statusListener);
      }
}
}
```

The capability exists within this new Progress class to send progress messages to any registered listeners. There is one Progress class for an installation application. Each object being installed calls the same Progress instance. A class that implements Status Listener must register with the existing Progress instance to receive notifications. An exemplary class that implements the Status Listener interface and is used to register a new listener with the Progress class is as follows:

```
public class MyListener implements StatusListener{
      public MyListener( ){
            //Add this object to Progress as listener
            Progress.addStatusListener(this);
      }
      /**
      *Send a status message.
      *
      *@param text the status message.
      */
      public void notify(String text){
            Process status message and do whatever is
            needed.
      }
      /**
      *Send a status message.
      *
      *@param message1 the directory of the file being
      *installed or another comment.
      *@param message2 the name of the file being
      *installed or another comment.
      *@param percent the percent complete of the process.
      */
      public void notify(String message1, String message2, int
percent){
            Process status message and do whatever is
            needed.
      }
      /**
      *Stop all monitoring and close connection
      */
      public void exitStatus( ){
            //Remove this object from Progress
            Progress.removeStatusListener(this);
      }
}
```

The processing done in the notify( ) methods in MyListener will vary between installation applications. Thus, a developer of the Status Listener class for the external process may configure these notify( ) methods to perform the necessary functions for the particular installation program and desired output of progress and status information.

In operation, when an installation application is initiated, the installation application creates an instance of the Progress class, i.e. a Progress object. An instance of the Listener class may then be created, i.e. a Listener object. When the Listener object is created, it registers with the Progress object.

During installation, another object, e.g., the object being installed, calls the ProgressInfo( ) method on the Progress object. This causes the status message generated by the installation application to be sent to the Listener object via the Progress object. That is, the Status Producer interface enables listeners to register so that when the ProgressInfo( ) method is invoked, the status message sent to the Progress object is relayed to all registered Listener objects.

The status and progress functionality of the present invention can be enhanced further by providing specific Status Listeners that forward these status and progress messages to any process including remotely located processes, such as processes running on different computing systems coupled to a network, e.g., the Internet. If the Status Listeners are enhanced so that they are capable of forwarding status and progress messages, for example, over TCP/IP connections, a local or remote web browser application may be used to receive the status and progress messages.

Figure 5:
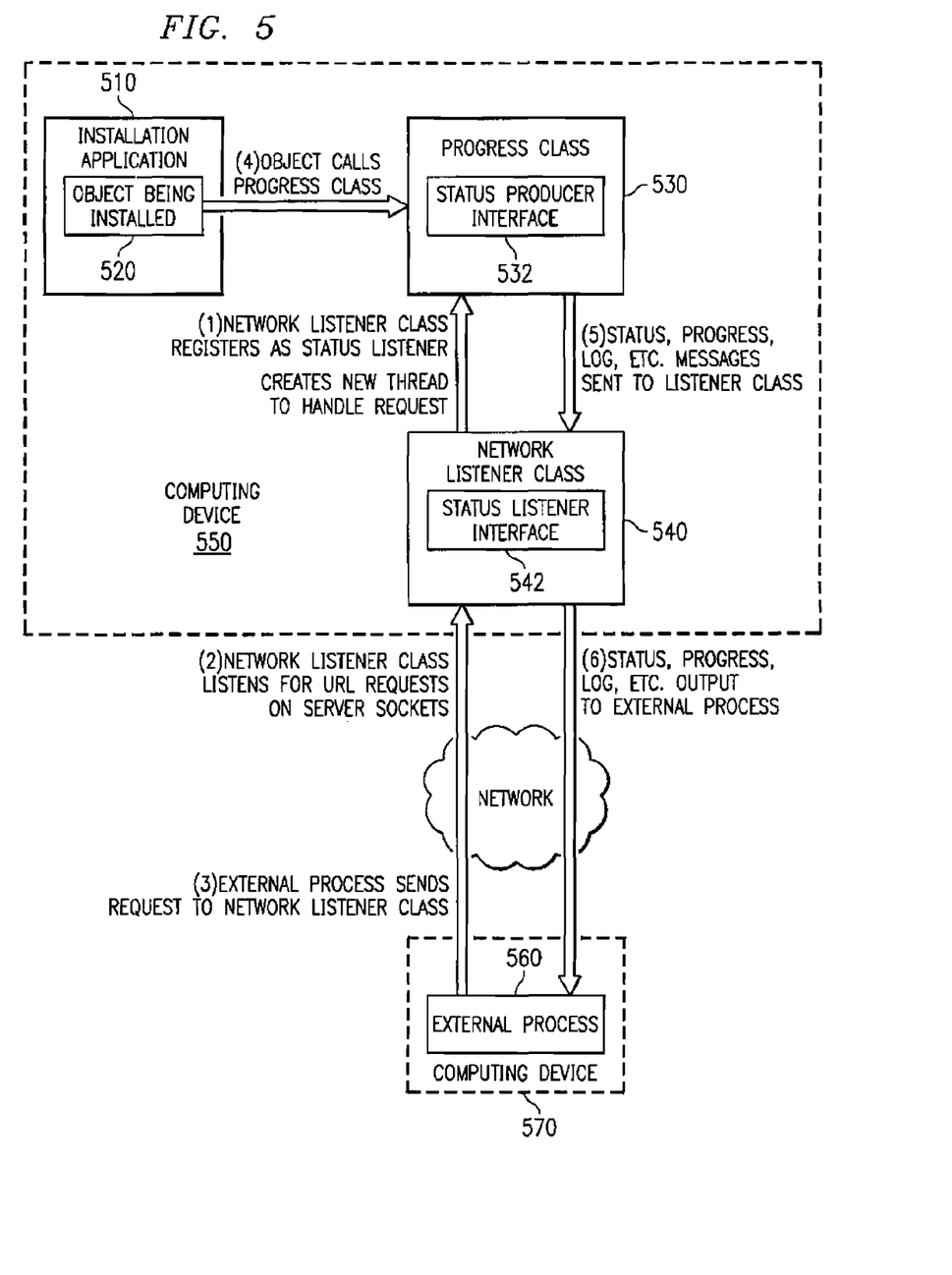
FIG. 5 is an exemplary diagram illustrating the primary operational components of another embodiment of the present invention.

This enhanced embodiment of the present invention is illustrated in FIG. 5. As shown in FIG. 5, an installation application 510 creates an instance of the Progress class 530, i.e. a Progress object, and an instance of the Network Listener class 540, i.e. a Network Listener object. When the Network Listener object is created, it registers with the Progress object. The Network Listener object functions as both a Status Listener object and as a listener for requests from external processes on predetermined communication ports.

A remotely located computing device 570 has an external process 560, such as a web browser application, running on it. This external process 560 sends a request message to the Network listener object via TCP/IP connections of the network. The Network Listener object is configured to use TCP/IP to communicate with the external process 560 such that status and progress messages provided via the Status Producer interface 532 are transmitted to the external process via the Status Listener interface 542 and Network Listener object as data packets over TCP/IP communication links of the network.

The new network listener class functions as a Hypertext Transfer Protocol (HTTP) server that listens for requests on a particular port. When a request is received from an external process and that request has the correct Uniform Resource Locator (URL), the connection between the external process 560 and the Network Listener object remains open for the life of the installation application or until the external process 560 closes the connection.

During installation, another object, e.g., the object being installed, calls the ProgressInfo( ) method on the Progress object. This causes the message to be sent to the Network Listener object. In addition to the Network Listener being a StatusListener, it is also is listening for connection requests on a network port. This is how a remote process, such as a web browser connects to the installation program to obtain status messages. When a remote connection is made, the Network Listener object forwards any new messages it receives to any remote connections currently open.

There may be simultaneous installations occurring on one system, thus any available port within a given range of ports may be used. A system can only have one process listening on any given port. To enable more than one Network Listener object on a system, additional ports must be used. Different ports can be accessed by a web browser by specifying the port in the URL such as http://www.myserver.com:8000/itj/myinstall, where 8000 is the port number.

To provide a level of security, the http server will only respond to a particular URL. This can be set by the Network Listener class, and becomes the password for that install program. For example, if the install status can be accessed by a browser using http://www.myserver.com: 8000/itj/myinstall/status, then the only way a user may monitor the installation application is to enter the entire URL. If "/myinstall/" is left out, then the installation application cannot be monitored. The "/itj/myinstall/" may be specified by the Network Listener class, so it can be set to any text string. Unless a user knows what this text string is, there is no way to connect to and monitor the installation application.

An exemplary implementation of the network status listener class is shown below:

```
public class NetworkStatusListener implements StatusListener,
Runnable{
    /**
    *Constructor
    *
    *@param root The URL root needed to access this server. This
    *is sort of a security provision. The URL must start with
this *root otherwise, an error is returned. (Default is "itj")
    *@param port The port to listen on. (Default is "8051")
    */
    public NetworkStatusListener(String root, int port){
        //if not already running, then start server
        If (!running){
            this.port=port;
            this.root=root;
            running=true;
            Thread runner = new Thread(this);
            runner.start( );
        }
    }
    /**
    *Send a status message.
    *
    *@param text the status message.
    */
    public void notify(String text){
        for (int i=0; i<httpServers.size( ); i++){
            NetworkListenerRequest sr = (NetworkListener
            Request)httpServers.elementAt(i);
            sr.notify(text);
        }
    }
    /**
    *Send a status message.
    *
    *@param message1 the directory of the file being installed or
    *another comment.
    *@param message2 the name of the file being installed or
    *another comment.
    *@param percent the percent complete of the process.
    */
    public void notify(String message1, String message2, int
percent){
        for (int i=0; i<httpServers.size( ); i++){
            NetworkListenerRequest sr = (NetworkListener
            Request)httpServers.elementAt(i);
            sr.notify(message1, message2, percent);
        }
    }
    /**
    *Stop all monitoring and close connection
```

-continued

```
    */
    public void exitStatus( ){
        for (int i=0; i<httpServers.size( ); i++){
            NetworkListenerRequest sr= (NetworkListener
            Request)httpServers.elementAt(i);
            sr.exitStatus( );
        }
    }
    /**
    *Run method - Listen on server socket for an incoming request
    *and start a new thread to handle that request.
    */
    public void run( ){
        while (!done){
            //Find an available port to use if specified port
            is unavailable
            port=getNextAvailablePort(port);
            //Open up socket and listen on our port
            ServerSocket ss=new ServerSocket(port);
            boolean firstPass=true;
            while (true){
                //Accept incoming request on new thread
                Socket s=ss.accept( );
                NetworkListenerRequest sr=new
NetworkListener        Request(this, s);
                sr.setRoot(root);
                httpServers.addElement(sr);
                new Thread(sr).start( );
            }
        }
    }
}
/**
*Class to process HTTP requests and send result back to client.
*/
    Class NetworkListener Request implements Runnable{
    /**
    *Constructor
    */
    NetworkListenerRequest(NetworkListener http, Socket s){
        ...
    }
    /**
    *Set the URL root needed to access this server. This is sort
    *of a security provision. The URL must start with this root
    *otherwise an error is returned.
    *
    *@param root the URL root
    */
    public void setRoot(String root){
        this.root=root;
    }
    /**
    *Send a status message.
    *
    *@param message1 the directory of the file being installed or
    *another comment.
    *@param message 2 the name of the file being installed or
    *another comment.
    *@param percent the percent complete of the process.
    */
    public void notify(String message1, String message2, int
percent){
        write("<br><b>STATUS:</b>\n"+message1+"\n"+message2+
        "\n"+percent+"\n");
        flush( );
    }
    /**
    *Send a status message.
    *
    *@param text the status message.
    */
    public void notify(String text){
        write("<br><b>STATUS:</b>\n"+text+"\n");
        flush( );
    }
    /**
    *Stop all monitoring and close connection
    */
```

-continued

```
    public void exitStatus( ){
        done=true;
    }
    }
    /**
    *Run method - Process HTTP request.
    */
    public void run( ){
        Read the HTTP request
        Read HTTP type and header
        Extract the parameters and requested file from the URL
        If valid request{
            If file starts with root{
                Write out response header
                //Write out first part of HTML page
                write("<br><b>PROGRAM:</b>"+program+"\n");
                write("<br><b>TYPE:</b>"installation\n");
                write("<br><b>MONITOR STATUS:</b>\n");
                //Wait until done before closing connection
                while (!done){
                    Wait for a variable number of seconds
                    Send data to connection to keep it
from                timing out
                }
            }
        }
        //Remove this thread from the current connection group
        httpServers.removeElement(this);
    }
}
```

Thus with a Network Listener such as that described above, the ability to send status and progress messages to any registered process may be enhanced to include external processes running on remotely located computing devices. Thus, not only is the problem of the prior art with regard to sending status and progress messages only to a GUI object or data file overcome by the present invention, but the present invention also provides for sending such status and progress messages to processes running on remotely located computing devices, such as web browsers or the like.

Figure 6:
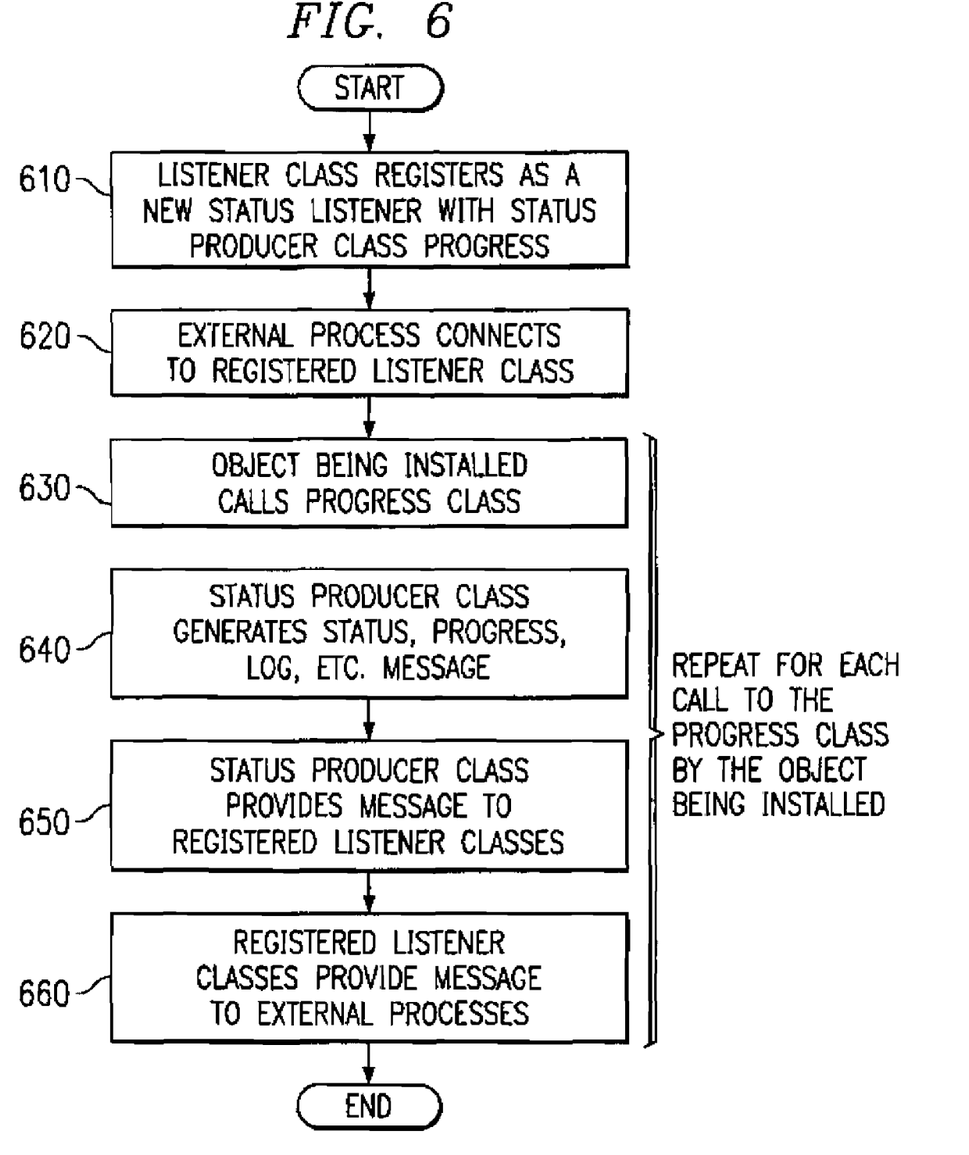
FIG. 6 is a flowchart outlining an exemplary operation of the present invention.

FIG. 6 is an exemplary flowchart outlining an exemplary operation of the present invention. As shown in FIG. 6, the operation starts with a listener class registering as a new status listener (step 610). The external process then connects to the registered listener class (step 620). The object being installed then calls the progress class (step 630). The status producer interface implemented by the progress class generates a status message, progress message, log message, or the like (step 640). The status producer interface is then used to provide the message to registered listener classes (step 650). The registered listener class provides the message to the external process (step 660).

While the above embodiments of the present invention are described primarily with reference to status and progress messages, the present invention may further be extended to the sending of log messages to any registered processes. Logs, i.e. files containing log messages, are used by installation applications to indicate options selected and the successful or unsuccessful results of operations performed during the installation operation. When installation operations are silently invoked by another master installation application, the log information becomes critical to proper installation behavior. The master installation application must monitor the logging of messages to identify if the silent installation was successful or if it failed. Obviously, if there was a failure, then an error message should be reported back to the user and, if critical, installation should terminate.

Currently there are two ways to monitor the logging of a silent installation operation. The first is to wait until the installation is complete and then read in the log file and parse it for predefined messages that indicate a success or failure. A second way is to monitor the log file while it is being written. This second approach is much more complicated and requires the tracking of changes to the log file, however, it does provide immediate feedback to the master installation application.

The present invention may be used to enhance the monitoring of the log file as it is being written. The present invention improves upon the monitoring of the log file by providing a way for an external process to register as a log listener and then have log messages relayed to it either locally or remotely.

Similar to the Progress class, there exists a Logger class that can be called to add log messages to a log file. This Logger class has several methods which can be called by an installation program. One of these methods is the log ( ) method shown below:

```
public class Logger {
/**
*Add text to log file. If the file name is "", then this prints. to
*system out.
*
*@param fileName the name of the log file.
*@param text the text to write to the log.
*@param event the name of the log event.
*/
    public static void log(String fileName, String
        textString, String event){
        If (logging enabled){
            Open fileName
            Append event and textString to end of file
            Close fileName
        }
    }
}
```

The log ( ) method simply appends the message to the end of the log file if logging is enabled. The limitation with this approach is that the log message is only sent to the log file. However, by changing this log ( ) method to send its log message to any object that has asked for it, logging flexibility is greatly increased. Thus, for example, the log message may be both sent to the log file and also output to another process that has requested the log message be provided to it.

The present invention modifies the log ( ) method shown above so that it implements the Log Listener and Log Producer interfaces which are similar to the Status Listener and Status Producer interfaces discussed above. It should be appreciated that the Log Listener and Log Producer interfaces are only specific types of the Status Listener and Status Producer interfaces. Thus, when the term "status" is used in the present application, this term is intended to mean any status, progress or log messages that may be sent by an installation application.

An example of the Log Listener interface is shown below:

```
public interface LogListener {
/**
*Send a log message.
*
*@param text the log message.
*/
public void log(String text);
/**
*Stop all monitoring and close connection
*/
public void exitLog( );
}
```

A Log Producer interface, according to one exemplary embodiment of the present invention, is as follows:

```
Public interface LogProducer {
    /**
    *Add a log listener.
    *
    *@param logListener the log listener to add
    */
    public void addLogListener(LogListener
    logListener);
    /**
    *Remove a log listener.
    *
    *@param logListener the log listener to remove
    */
    public void removeLogListener(LogListener
    logListener);
}
```

If the Logger class shown above is modified to implement the LogProducer interface, then any class that implements the Log Listener interface can obtain all logging messages. An example of such a new Logger class is as follows:

```
Public class Logger impelments LogProducer {
/**
*Add text to log file. If the file name is "", then this prints to
*system out.
*
*@param fileName the name of the log file
*@param text the text to write to the log.
*@param event the name of the log event
*/
    public static void log(String fileName, String
        textString, String event){
        if (logging enabled){
            Open fileName
            Append event and textString to end of file
            Close fileName
            //Send log message to any registered
            processes
            for (int i=0; i<LogListeners.size( );i++){
                ((LogListeners)logListeners.elementAt
                (i)).log(event+":"+textString);
            }
        }
    }
    /**
    *Add a log listener
    *
    *@param logListener the log listener to add
    */
    public static void addLogListener(LogListener logListener){
        synchronized(loglock){
            logListeners.removeElement(logListener);
            logListeners.addElement(logListener);
        }
    }
    /**
    *Remove a log listener
    *
    *@param logListener the log listener to remove
    */
    public static void removeLogListener(LogListener logListener){
        synchronized(loglock){
            logListeners.removeElement(logListener);
        }
    }
}
```

The capability exists within this new Logger class to send log messages to any registered log listeners. There is one Logger class for an installation application. Each object being installed calls the same Logger instance. A class that implements the Log Listener interface must register with the existing Logger instance to receive log messages. An exemplary class that implements the Log Listener interface and is used to register a new Log listener with the Logger class is as follows:

```
public class MyListener implements LogListener{
    public MyListener( ){
        //Add this object to Logger as listener
        Logger.addLogListener(this);
    }
    /**
    *Send a log message.
    *
    *@param text the log message.
    */
    public void log(String text){
        Process log message and do whatever is
        needed.
    }
    /**
    *Stop all monitoring and close connection
    */
    public void exitLog( ){
        //Remove this object from Logger
        Logger.removeLogListener(this);
    }
}
```

The processing done in the log ( ) method in MyListener will vary between installation applications.

A Network Log Listener, which is similar to the Network Listener and functions in a similar manner, may be provided to allow for monitoring of log messages generated by an installation application from a remote location. An example of such a Network Log Listener class is as follows:

```
public class NetworkLogListener implements LogListener, Runnable{
    /**
    *Constructor
    *
    *@param root The URL root needed to access this server.   This
    *is sort of a security provision.   The URL must start with
this *root otherwise, an error is returned.   (Default is "itj")
    *@param port The port to listen on.   (Default is "8051")
    *@param logFile the log file name
    *@param vars the install properties.
    */
    public NetworkLogListener(String root, int port, String
logFile){
        //if not already running, then start server
        if (!running){
            this.port=port;
            this.root=root;
            this.logFile = logFile;
            running=true;
            Thread runner = new Thread(this);
            runner.start( );
        }
    }
    /**
    *Send a log message.
    *
    *@param text the status message.
    */
    public void log(String text){
        for (int i=0; i<httpServers.size( ); i++){
            NetworkLogListenerRequest sr = (NetworkLogListener
            Request)httpServers.elementAt(i);
            sr.log(text);
        }
    }
    /**
    *Stop all monitoring and close connection
    */
    public void exitLog( ){
```

-continued

```
        for (int i=0; i<httpServers.size( ); i++){
            NetworkLogListenerRequest sr= (NetworkLogListener
            Request)httpServers.elementAt(i);
            sr.exitLog( );
        }
    }
    /**
    *Run method - Listen on server socket for an incoming request
    *and start a new thread to handle that request.
    */
    public void run( ){
        while (!done){
            //Find an available port to use if specified port
            is unavailable
            port=getNextAvailablePort(port);
            //Open up socket and listen on our port
            ServerSocket ss=new ServerSocket(port);
            boolean firstPass=true;
            while (true){
                //Accept incoming request on new thread
                Socket s=ss.accept( );
                NetworkLogListenerRequest sr=new
NetworkLogListenerRequest(this, s);
                sr.setRoot(root);
                httpServers.addElement(sr);
                new Thread(sr).start( );
            }
        }
    }
}
/**
*Class to process HTTP requests and send result back to client.
*/
Class NetworkLogListenerRequest implements Runnable{
    /**
    *Constructor
    */
    NetworkLogListenerRequest(NetworkLogListener http, Socket s){
        ...
    }
    /**
    *Set the log file
    *
    *@param logFIle the log file name
    */
    public void setLogFile(String logFile){
        this.logFile = logFile;
    }
    /**
    *Set the URL root needed to access this server. This is sort
    *of a security provision. The URL must start with this root
    *otherwise an error is returned.
    *
    *@param root the URL root
    */
    public void setRoot(String root){
        this.root=root;
    }
    /**
    *Send a log message.
    *
    *@param text the log message.
    */
    public void log(String text){
        clientStream.writeBytes("<br><b>LOG:</b>\n"+text+"/n");
        clientStream.flush( );
    }
    /**
    *Stop all monitoring and close connection
    */
    public void exitLog( ){
        done=true;
    }
    /**
    *Run method - Process HTTP request.
    */
    public void run( ){
        Read the HTTP request
        Read HTTP type and header
        Extract the parameters and requested file from the URL
        If valid request{
            If file starts with root{
                Write out response header
                //Write out first part of HTML page
                write("<br><b>PROGRAM:</b>"+program+"\n");
                write("<br><b>TYPE:</b>"installation\n");
                write("<br><b>MONITOR STATUS:</b>\n");
                //Wait until done before closing connection
                while (!done){
                    Wait for a variable number of seconds
                    Send data to connection to keep it
         from          timing out
                }
            }
        }
        //Remove this thread from the current connection group
        httpServers.removeElement(this);
    }
}
```

In a similar manner as discussed above with the Network Listener, the Network Log Listener may be used as both a Log Listener and as a listener for requests from remotely located external processes received over certain predefined ports. In this way, a remotely located external process may open a connection to the Network Log Listener and the Network Log Listener sends log messages to any open connections. Thus, a user of a remotely located client device may monitor the installation application from his/her remote location whether or not this installation application performs a silent installation or a non-silent installation.

Thus, the present invention provides an apparatus and method for generating and routing status, progress and log messages to processes registered as listeners to the installation program. Such processes are not limited to GUI objects as in the prior art Progress class. Rather, any process may register as a listener to the installation program and obtain status, progress and log messages.

Furthermore, the present invention allows processes running on remotely located computing devices to connect to a registered listener and obtain these status, progress and log messages. In this way, a web browser application may be used to connect to a registered listener and status, progress, and log messages may be obtained via TCP/IP connections over a network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product encoded in a computer readable medium and operable by a data processing system for providing log messages in an installation process, the computer program product comprising:

first instructions for registering a process as an installation event listener with a logging process which logs installation events, wherein the logging process is a process within the installation process, wherein the logging process is called by each object being installed by the installation process, and wherein the logging process is an instance of a class object that is subclassed to listen for particular installation events;

second instructions for starting the installation process to install a first object, wherein the installation process calls a secondary installation process to install a second object; and third instructions for logging installation events to a local log file as well as sending the installation event log messages to the registered process, as the installation process progresses, using the logging process, wherein the logging process sends the installation event log messages regarding installation of the first object and the second object.

2. The computer program product of claim 1, wherein the process is a process running on a computing device remotely located from a computing device on which the installation process is running.

3. The method of claim 1, wherein the third instructions for logging installation events include instructions for implementing a producer interface that sends the installation event log messages to a listener interface, the listener interface being implemented by the registered process.

4. The computer program product of claim 1, wherein the first instructions for registering the process as an installation event listener include instructions for receiving a call of a listener class from the process and instructions for creating a listener object which registers with an object associated with the installation process.

5. The computer program product of claim 1, wherein the logging process is an instance of a class that is subclassed to listen for installation event log messages sent to a particular port.

6. The computer program product of claim 4, wherein the installation event log messages include at least one of a directory of a file being installed, a name of the file being installed and a percentage of the installation of the file that is complete.

7. The computer program product of claim 4, wherein the object is a Logger object that is used by a monitor process to send log messages to registered listener objects.

8. The computer program product of claim 4, wherein the installation event log messages include at least one of a text string and event information.

9. The computer program product of claim 1, further comprising:

fourth instructions for creating a network listener object, wherein the network listener object monitors one or more predefined ports for requests from registered installation event listeners.

10. The computer program product of claim 9, wherein the network listener object opens a connection with a registered installation event listener when a request is received from the registered installation event listener at one of the one or more predefined ports.

11. The computer program product of claim 10, wherein the third instructions for sending the installation event log message to the registered process include instructions for sending the information to any open communication connection monitored by the network listener object.

* * * * *